US008746889B2

(12) United States Patent
Leong et al.

(10) Patent No.: US 8,746,889 B2
(45) Date of Patent: Jun. 10, 2014

(54) AUTO-VARIABLE PERSPECTIVE AUTOSTEREOSCOPIC 3D DISPLAY

(75) Inventors: Daniel Leong, Punggol Field (SG); Frederick F. Kuhlman, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 253 days.

(21) Appl. No.: 13/282,555

(22) Filed: Oct. 27, 2011

(65) Prior Publication Data
US 2013/0107217 A1 May 2, 2013

(51) Int. Cl.
*G03B 21/00* (2006.01)
*G03B 21/28* (2006.01)
*G03B 21/60* (2014.01)
*G02B 27/24* (2006.01)
*G03H 1/26* (2006.01)

(52) U.S. Cl.
USPC .............. 353/7; 353/99; 359/458; 359/471; 359/23

(58) Field of Classification Search
USPC ............ 353/7, 98, 99; 359/458, 462, 471, 23
See application file for complete search history.

(56) References Cited

U.S. PATENT DOCUMENTS

| 4,799,739 A | 1/1989 | Newswanger |
| 5,609,939 A | 3/1997 | Petersen et al. |
| 7,352,514 B2 | 4/2008 | Hendriks et al. |
| 2004/0196438 A1 | 10/2004 | Togino |
| 2005/0030622 A1* | 2/2005 | Morita et al. ............... 359/464 |
| 2006/0266135 A1 | 11/2006 | Nishikawa et al. |
| 2007/0196616 A1 | 8/2007 | Stalder et al. |
| 2007/0242237 A1 | 10/2007 | Thomas |
| 2008/0297593 A1 | 12/2008 | Debevec et al. |
| 2011/0170184 A1 | 7/2011 | Wolk |

FOREIGN PATENT DOCUMENTS

| EP | 0 650 301 A2 | 4/1995 |
| EP | 0 959 377 A2 | 11/1999 |
| WO | 94/04948 | 3/1994 |
| WO | 2010/148258 | 12/2010 |

OTHER PUBLICATIONS

European Search Report dated Feb. 3, 2014.

* cited by examiner

*Primary Examiner* — Georgia Y Epps
*Assistant Examiner* — Magda Cruz
(74) *Attorney, Agent, or Firm* — Lawrence D. Hazelton

(57) ABSTRACT

An autostereoscopic display configured to display a three dimensional (3D) image of a scene. The autostereoscopic display uses a single projector to project a plurality of projected images into a mirror arrangement fixedly positioned in the projection field of the single projector to reflect the plurality of projected images onto the holographic diffuser from distinct directions such that a 3D image is perceived by a person viewing the holographic diffuser.

7 Claims, 3 Drawing Sheets

AUTO-VARIABLE PERSPECTIVE AUTOSTEREOSCOPIC 3D DISPLAY

TECHNICAL FIELD OF INVENTION

This disclosure generally relates to an autostereoscopic 3D display, and more particularly relates to an autostereoscopic display that uses a fixed mirror arrangement to reflect projected images onto the holographic diffuser from distinct directions.

BACKGROUND OF INVENTION

Three dimension (3D) displays using specialized glasses are known. A cost effective way to display 3D images without using specialized glasses is desired.

SUMMARY OF THE INVENTION

In accordance with one embodiment, an autostereoscopic display configured to display a three dimensional (3D) image of a scene is provided. The autostereoscopic includes a single projector, a holographic diffuser and a fixed position mirror arrangement. The single projector is configured to project a plurality of projected images into a projection field. Each projected image is characterized as a distinct perspective view of the scene. The holographic diffuser is configured to display the plurality of projected images projected by the single projector. The mirror arrangement is fixedly positioned in the projection field. The mirror arrangement is configured to reflect the plurality of projected images onto the holographic diffuser from distinct directions. The directions are such that a 3D image is perceived by a person viewing the holographic diffuser.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
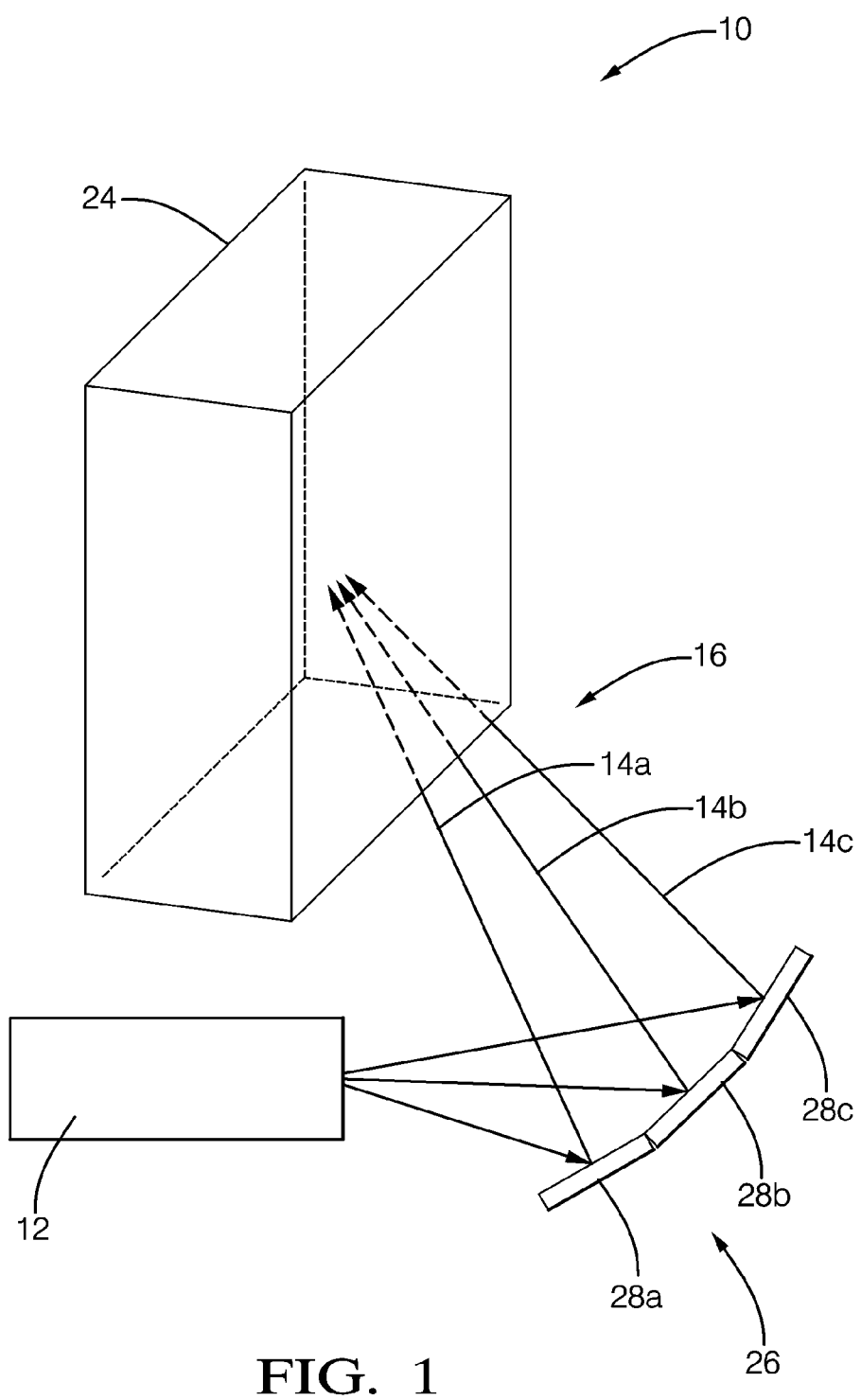
FIG. 1 is an illustration an autostereoscopic display in accordance with one embodiment.
Figure 2:
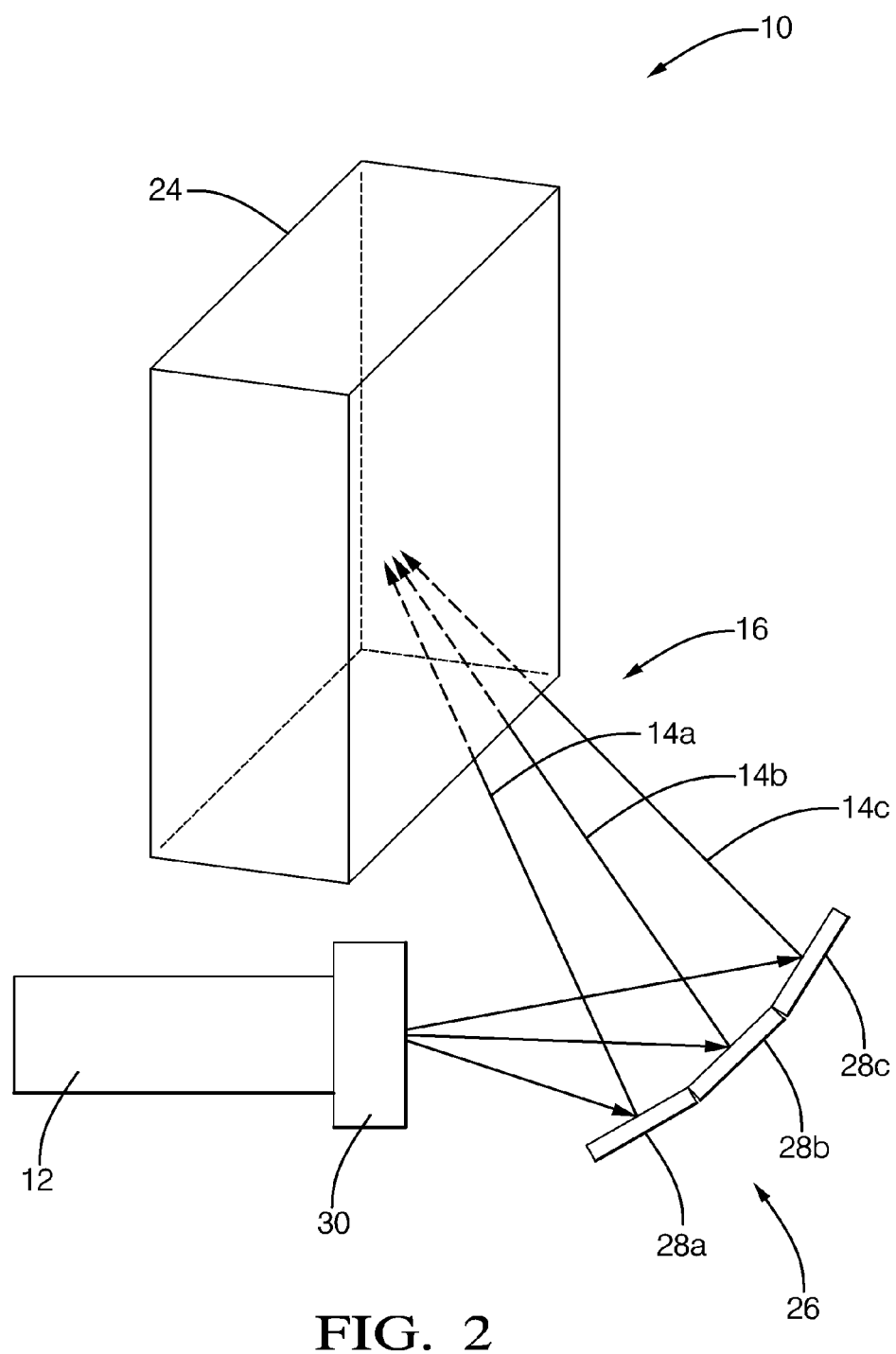
FIG. 2 is an illustration an autostereoscopic display in accordance with another embodiment.

FIGS. 1 and 2 illustrate non-limiting examples of an autostereoscopic display 10. In general, the display 10 is configured to display a three dimensional (3D) image of a scene. As used herein, a scene includes, but is not limited to, any field of view that could be photographed using a 3D type camera, or any image that could be synthesized or animated to provide a 3D type image of an object or viewable location.

The display 10 includes a single projector 12 configured to project a plurality of projected images 14a, 14b, 14c into a projection field 16. As used herein, single projector means an image projection device having a single optical path or opening for light to emit from the single projector 12, and so specifically excludes any embodiments that have multiple projectors to project the projected images 14a, 14b, 14c. As such, the configuration of display 10 is advantageous over displays and systems that use multiple projectors at least for reasons of cost and simplicity of manufacturing.

Figure 3:
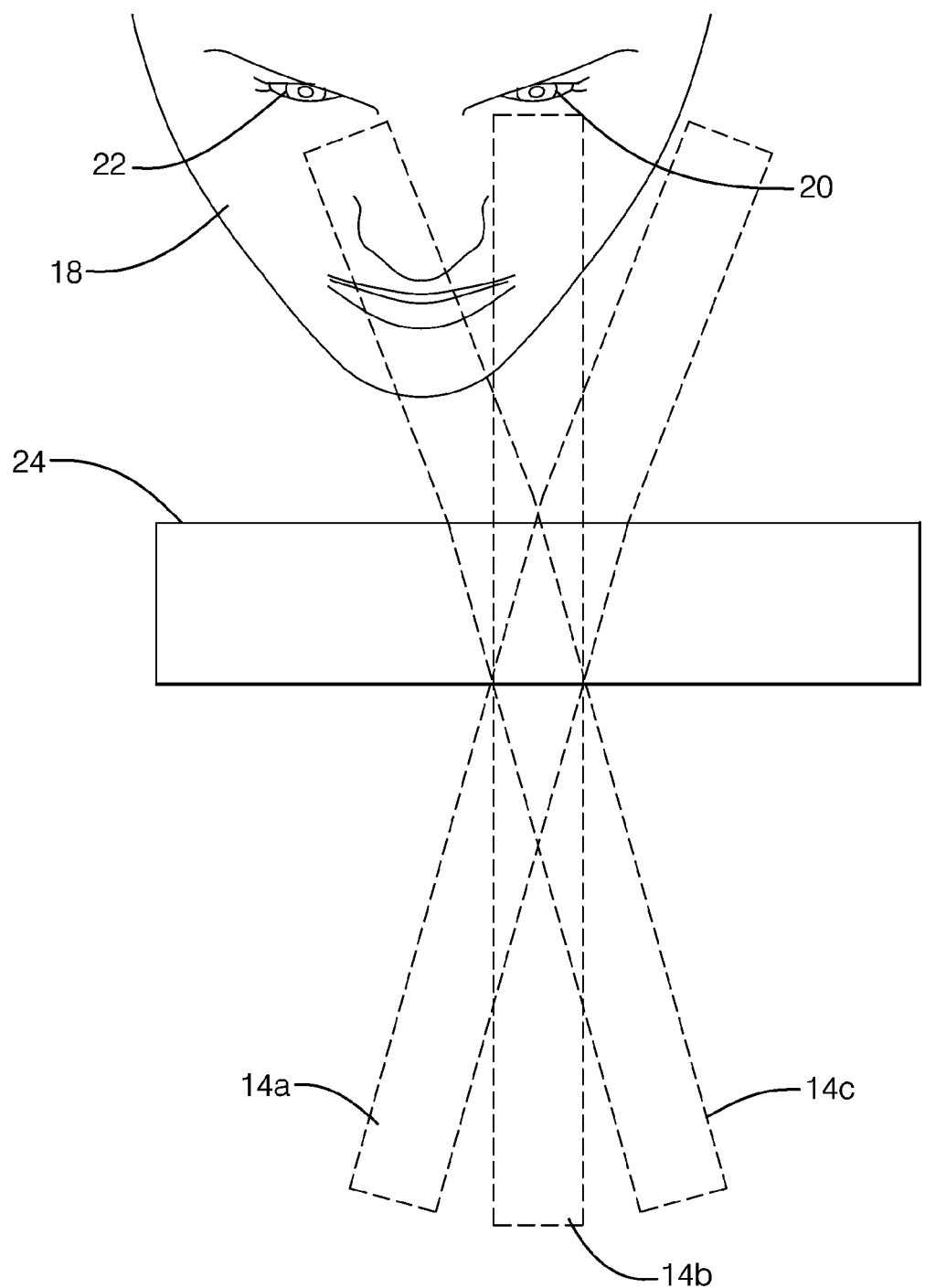
FIG. 3 is a light path diagram of the autostereoscopic display of FIGS. 1 and 2 in accordance with an embodiment.

The non-limiting examples provided herein show three projected images 14a, 14b, 14c, however it is appreciated that only two projected images are required to provide a 3D image to a person 18 (FIG. 3). The third projected image, or any number of additional projected images, may be provided so the person 18 viewing the display 10 is not restricted to viewing the display from a single direction or a fixed viewing position, but may move to other viewing positions or viewing directions and still perceive a 3D image. With more than two projected images, the display 10 is able to show an image that changes the apparent viewing perspective as the person 18 moves about.

Each projected image 14a, 14b, 14c may be characterized as a distinct perspective view of the scene or object being displayed. For example, projected image 14b may be characterized as a centered view of the scene being displayed; projected image 14a may be characterized as a left-of-center view; and projected image 14c may be characterized as a right-of-center view. If the display 10 is viewed by the person 18 from the position or direction illustrated in FIG. 3, the person's left eye 20 receives the centered view provided by projected image 14b, and the person's right eye 22 receives the right-of-center view provided by projected image 14c. Then if the person 18 moves to a different position so, for example, the right eye 22 receives the projected image 14b and the left eye 20 receives the projected image 14a, the person 18 still perceives a 3D image of the scene being displayed, but the perspective of the scene perceived the person 18 has shifted in accordance with the movement or change in position of the person 18. In other words, as the person 18 moves about the display 10, the 3D image seen by the person 18 changes such that the perspective of the scene changes in a manner similar to what would be perceived by the person 18 if what is being displayed was actually present instead of being projected by the display 10.

It should be appreciated that if displaying a wider range of perspectives is desired, then additional projected images are needed. For example, if six different perspectives for the person 18 moving left and right were desired, then seven projected images may be required. The arrangement of the projected images 14a, 14b, 14c is illustrated as a horizontal arrangement only for the purposes of explanation, and not limitation. For example, the display 10 may be configured to project another row of projected images (not shown) aligned below the projected images 14a, 14b, 14c so that the person 18 could also move up and down and perceive a change in perspective just as the change in perspective is perceived by moving left and right.

The display 10 may include a holographic diffuser 24 configured to display the plurality of projected images 14a, 14b, 14c projected by the single projector 12. The display 10 has been demonstrated using sheets of clear acrylic material treated on one side to have a translucent appearance that are available from Art-Friend, 391 Orchard Road, #04-20M, Ngee Ann City, Singapore 238872; Part numbers:_ AF463095 ACRYLIC SHT MATT CLEAR 3MM 9X121N or AF4630951 ACRYLIC SHT MATT CLEAR 3MM 12X181N. Alternatively, the holographic diffuser 24 may be similar to that described in U.S. Pat. No. 4,799,739 to Newswanger, titled REAL TIME AUTOSTEREOSCOPIC DISPLAYS USING HOLOGRAPHIC DIFFUSERS, issued Jan. 24, 1989; or U.S. Pat. No. 5,609,939 to Peterson et al., titled VIEWING SCREEN FORMED USING COHERENT LIGHT, issued Mar. 11, 1997.

The display 10 includes a mirror arrangement 26 that is fixedly positioned in the projection field 16. In general, the mirror arrangement 26 is configured to reflect each of the plurality of projected images 14a, 14b, 14c onto the holographic diffuser 24 from distinct directions, where the directions are such that a 3D image is perceived by the person 18 when viewing the holographic diffuser 24. The mirror arrangement 26 may include, but is not limited to, a plurality of planar minors 28a, 28b, 28c arranged to reflect the plurality of projected images 14a, 14b, 14c onto the holographic diffuser 24. It is appreciated that for some configurations of the display 10 when planar mirrors are used, the projected images 14a, 14b, 14c may need to be distorted or compensated so that when the projected image is displayed on the holographic diffuser 24, the image is displayed with the proper aspect ratio and parallel boundaries. Alternatively, if the single projector 12 projects projected images that are not compensated, the individual mirrors may need to be curved (i.e. non-planar) in such a manner as to compensate for variable projection distances from the single projector 12 to any particular point on the holographic diffuser 24.

In one embodiment of the autostereoscopic display 10, the single projector 12 may be configured to simultaneously project the plurality of projected images 14a, 14b, 14c onto distinct portions of the mirror arrangement. In other words, the entire image output by the single projector 12 is segregated into distinct regions so that all of the projected images are simultaneously output by the single projector 12. It is appreciated that the resolution of each of the projected images 14a, 14b, 14c will be a fraction of the projection resolution of the single projector 12, but such a configuration is cost efficient.

In another embodiment, the single projector 12 may be configured to time-multiplex project the plurality of projected images. In other words, at any instant in time, only one of the projected images 14a, 14b, 14c is being output by the single projector 12. Such a configuration would be advantageous so that each of the projected images 14a, 14b, 14c would be projected at the highest resolution possible by the projector. However, it then becomes necessary to variably direct the image output by the single projector 12. As such, as illustrated in FIG. 2, the display 10, or more specifically the single projector 12, may include an electrowetting lens device 30 configured to direct each of the plurality of projected images 14a, 14b, 14c from the single projector 12 onto distinct portions of the mirror arrangement 26. A suitable example of an electrowetting lens is shown in U.S. Pat. No. 7,352,512 to Hendriks et al., titled VARIABLE FOCUS LENS, issued Apr. 1, 2008.

Accordingly, an autostereoscopic display 10 configured to display a three dimensional (3D) image of a scene is provided. The display 10 uses a single projector 12 instead of multiple projectors, and a fixed position mirror arrangement 26 instead of mechanically moving minors to simplify the assembly of the display 10 and reduce cost. Having the mirror arrangement 26 spaced apart from the holographic diffuser 24 allows for convenient packaging to make the display 10 a rear projection type display.

While this invention has been described in terms of the preferred embodiments thereof, it is not intended to be so limited, but rather only to the extent set forth in the claims that follow.

We claim:

1. An auto-variable perspective autostereoscopic display configured to display an auto-variable perspective three dimensional (3D) image of a scene, said display comprising:
   a single projector configured to project a plurality of projected images into a projection field, wherein each projected image is characterized as a distinct perspective view of the scene and each projected image is projected in distinct directions;
   a holographic diffuser configured to display the plurality of projected images projected by the single projector, wherein the holographic diffuser is configured so each image displayed is viewable from a distinct viewing position; and
   a mirror arrangement fixedly positioned in the projection field, said mirror arrangement configured to reflect the plurality of projected images onto the holographic diffuser from the distinct directions, wherein the distinct directions and the distinct perspective views of the scene are configured such that a variable perspective 3D image is perceived by a person viewing the holographic diffuser when the person changes the viewing position from which the person views the holographic diffuser.

2. The autostereoscopic display in accordance with claim 1, wherein the single projector is configured to simultaneously project the plurality of projected images onto distinct portions of the mirror arrangement.

3. The autostereoscopic display in accordance with claim 1, wherein the single projector is configured to time-multiplex project the plurality of projected images, and the display further comprises an electrowetting lens device configured to direct each of the plurality of projected images from the single projector onto distinct portions of the mirror arrangement.

4. The autostereoscopic display in accordance with claim 1, wherein the mirror arrangement comprises a plurality of planar mirrors arranged to reflect the plurality of projected images onto the holographic diffuser.

5. An autostereoscopic display configured to display a three dimensional (3D) image of a scene, said display comprising:
   a single projector configured to project a plurality of projected images into a projection field, wherein each projected image is characterized as a distinct perspective view of the scene, wherein the single projector is configured to time-multiplex project the plurality of projected images, and the display further comprises an electrowetting lens device configured to direct each of the plurality of projected images from the single projector onto distinct portions of the mirror arrangement;
   a holographic diffuser configured to display the plurality of projected images projected by the single projector; and
   a mirror arrangement fixedly positioned in the projection field, said mirror arrangement configured to reflect the plurality of projected images onto the holographic diffuser from distinct directions, wherein the directions are such that a 3D image is perceived by a person viewing the holographic diffuser.

6. The autostereoscopic display in accordance with claim 5, wherein the single projector is configured to simultaneously project the plurality of projected images onto distinct portions of the mirror arrangement.

7. The autostereoscopic display in accordance with claim 5, wherein the minor arrangement comprises a plurality of planar mirrors arranged to reflect the plurality of projected images onto the holographic diffuser.

* * * * *